W. R. CLARK.
Ditching Plow.
No. 68,697.                                   Patented Sept. 10, 1867
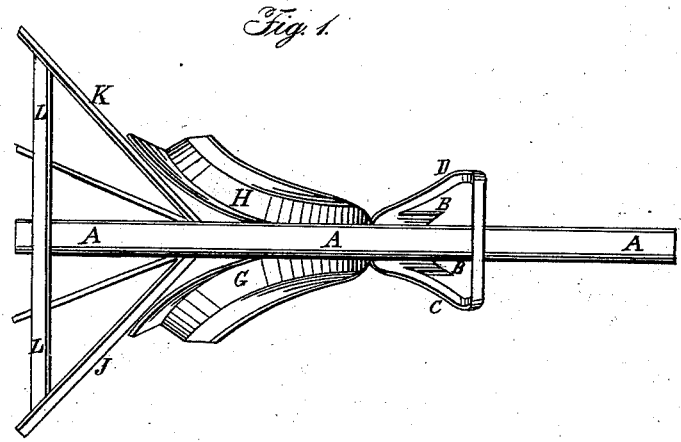
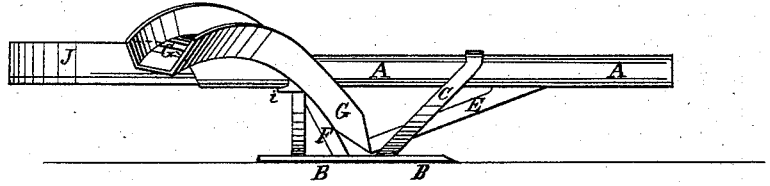
Witnesses:
Inventor:

UNITED STATES PATENT OFFICE.

WILLIAM R. CLARK, OF INDIANOLA, ILLINOIS.

IMPROVED DITCHING-PLOW.

Specification forming part of Letters Patent No. 68,697, dated September 10, 1867.

*To all whom it may concern:*

Be it known that I, WILLIAM R. CLARK, of Indianola, in the county of Vermillion and State of Illinois, have invented a new and useful Improvement in Ditching-Plows; and I do hereby declare that the following is a full, clear, and exact description thereof, which will enable others skilled in the art to make and use the same, reference being had to the accompanying drawings, forming part of this specification, in which—

Figure 1 is a top view of my improved machine. Fig. 2 is a side view of the same.

Similar letters of reference indicate like parts.

My invention has for its object to furnish an improved machine for forming open-ground ditches easily and quickly, which shall be simple in construction and effective in operation; and it consists in the combination of the bottom or foot piece, central and side brace-bars, side elevators, side wings and beam with each other, as hereinafter more fully described.

A is the beam, to which all the other parts of the machine are attached. B is the bottom or foot piece, the forward end or edge of which is made forked, as shown in Fig. 1, so as to incline the dirt toward the center, and so that, should either point strike a root or other obstruction, it would be drawn to the center, where it would be exposed to a central draft, and be severed or raised to the surface. The foot-piece B is connected to the beam, and supported by the side braces C D and the central braces E F. The brace E also divides the dirt raised by the foot-piece B into two parts, which then pass up the side elevators G H. The braces C D separate the dirt raised by the foot-piece B from that at the side of the ditch, and scrape or cut off the side of the ditch, so as to leave it smooth and of the proper inclination. G H are the side elevators, the lower ends of which are attached to the foot-piece B, and the middle parts of which are attached to the beam A, and also rest upon and are attached to the bar I, attached to the said beam. The upper parts of the side elevators G H curve outward, so as to leave the dirt at a suitable distance from the edge of the ditch. J K are wings placed in the rear of the elevators G H, the forward ends of which are secured to the beam A, and their rear ends are attached to the ends of the bar L, secured to the said beam. The wings J K receive the dirt from the elevators G H, and move it farther away from the edges of the ditch.

This machine is especially designed to form ditches through wet prairie-lands; but is equally applicable for use in other situations.

I claim as new and desire to secure by Letters Patent—

The foot-piece B, having its forward end made forked to incline the dirt and other obstructions toward the center, in combination with the brace-bars E, F, C, and D, side elevators G H, and side wings J K, substantially as described, for the purpose specified.

The above specification of my invention signed by me this 27th day of April, 1867.

WILLIAM R. CLARK.

Witnesses:
J. L. HILL,
ROBERT ANDERSON.